United States Patent
Ananthakrishnan et al.

(10) Patent No.: US 9,367,224 B2
(45) Date of Patent: Jun. 14, 2016

(54) METHOD AND APPARATUS FOR ALLOWING DRAG-AND-DROP OPERATIONS ACROSS THE SHARED BORDERS OF ADJACENT TOUCH SCREEN-EQUIPPED DEVICES

(75) Inventors: Ganesh Ananthakrishnan, Broomfield, CO (US); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 478 days.

(21) Appl. No.: 13/098,129

(22) Filed: Apr. 29, 2011

(65) Prior Publication Data
US 2012/0278727 A1 Nov. 1, 2012

(51) Int. Cl.
*G06F 3/048* (2013.01)
*H04L 29/08* (2006.01)
*H04W 76/00* (2009.01)
*G06F 3/0486* (2013.01)

(52) U.S. Cl.
CPC .......... *G06F 3/0486* (2013.01); *H04L 29/0854* (2013.01); *H04L 29/08576* (2013.01); *H04W 76/00* (2013.01)

(58) Field of Classification Search
CPC ................... H04L 29/08576; H04L 29/06027; H04L 29/06394; H04L 29/06537; H04L 29/08108; H04L 63/0823; H04L 41/22; H04L 29/08117; H04L 63/0272; H04M 2201/42; G06F 17/30017; G06F 3/0481; G06F 3/0486; G06F 9/4443; G06F 17/30; G06F 21/606; G06F 21/6236
USPC ......................................... 715/748, 864, 863
See application file for complete search history.

(56) References Cited

U.S. PATENT DOCUMENTS

| | | | | |
|---|---|---|---|---|
| 5,801,700 A | * | 9/1998 | Ferguson | 715/748 |
| 7,188,139 B1 | * | 3/2007 | Ayatsuka et al. | 709/204 |
| 8,190,707 B2 | * | 5/2012 | Trivedi et al. | 709/218 |
| 8,218,532 B1 | * | 7/2012 | Burritt et al. | 370/352 |
| 8,312,392 B2 | * | 11/2012 | Forutanpour et al. | 715/863 |
| 8,606,297 B1 | * | 12/2013 | Simkhai | H04W 4/02 455/456.2 |
| 2002/0065564 A1 | * | 5/2002 | Sheriff et al. | 700/11 |
| 2003/0154398 A1 | * | 8/2003 | Eaton et al. | 713/201 |
| 2004/0156501 A1 | * | 8/2004 | Zuili | 380/44 |

(Continued)

OTHER PUBLICATIONS

U.S. Appl. No. 12/875,281, filed Sep. 3, 2010, Mani.

(Continued)

*Primary Examiner* — Amy M Levy
(74) *Attorney, Agent, or Firm* — Sheridan Ross P.C.

(57) ABSTRACT

A user interface(s) in which the displays of different devices become "synchronized" when the devices are brought into close proximity with one another. One exemplary embodiment permits drag-and-drop procedures that originate on one device to be terminated on the other. Illustratively, the solution could be handled in the following manner:
 The user would place the second device alongside or in close proximity to the first device,
 The two devices would detect each other,
 The user would touch the representation (such as an icon) of the party on the second device's display that they wish to add to the call,
 The user would slide the representation across the first device/second device border onto the first device's screen,
 The user would slide the representation to a spotlight or hot spot and then lift the finger from the screen,
 The party would be connected to the call.

18 Claims, 6 Drawing Sheets

(56) References Cited

U.S. PATENT DOCUMENTS

| | | | |
|---|---|---|---|
| 2006/0053388 A1* | 3/2006 | Michelman | 715/775 |
| 2006/0053389 A1* | 3/2006 | Michelman | 715/775 |
| 2006/0106726 A1* | 5/2006 | Raley et al. | 705/59 |
| 2006/0107046 A1* | 5/2006 | Raley et al. | 713/168 |
| 2006/0116127 A1* | 6/2006 | Wilhoite et al. | 455/442 |
| 2006/0146765 A1* | 7/2006 | Van De Sluis et al. | 370/338 |
| 2006/0185005 A1* | 8/2006 | Graves et al. | 726/9 |
| 2007/0026371 A1* | 2/2007 | Wood | 434/317 |
| 2007/0124503 A1* | 5/2007 | Ramos et al. | 709/248 |
| 2007/0288599 A1* | 12/2007 | Saul et al. | 709/218 |
| 2008/0046478 A1* | 2/2008 | Mandre | G06Q 10/00 |
| 2009/0030971 A1* | 1/2009 | Trivedi et al. | 709/203 |
| 2009/0034591 A1 | 2/2009 | Julian et al. | |
| 2009/0140986 A1* | 6/2009 | Karkkainen et al. | 345/173 |
| 2009/0177810 A1* | 7/2009 | Kweon et al. | 710/33 |
| 2009/0288012 A1* | 11/2009 | Hertel | G06Q 20/02 715/738 |
| 2010/0121961 A1* | 5/2010 | Elleuch et al. | 709/228 |
| 2010/0153862 A1* | 6/2010 | Schreiber | G06Q 30/0273 715/760 |
| 2010/0172283 A1* | 7/2010 | Karaoguz et al. | 370/312 |
| 2010/0251124 A1* | 9/2010 | Geppert et al. | 715/734 |
| 2010/0251177 A1* | 9/2010 | Geppert et al. | 715/821 |
| 2010/0274852 A1* | 10/2010 | Anderson | G06Q 10/10 709/204 |
| 2010/0293543 A1 | 11/2010 | Erhart et al. | |
| 2011/0047511 A1* | 2/2011 | Essl | G06F 3/0486 715/836 |
| 2011/0055555 A1* | 3/2011 | Michaelis et al. | 713/156 |
| 2011/0083111 A1* | 4/2011 | Forutanpour et al. | 715/863 |
| 2011/0138064 A1* | 6/2011 | Rieger et al. | 709/228 |
| 2011/0163944 A1* | 7/2011 | Bilbrey et al. | 345/156 |
| 2011/0177818 A1* | 7/2011 | Heit et al. | 455/436 |
| 2011/0249079 A1* | 10/2011 | Santamaria et al. | 348/14.02 |
| 2011/0307841 A1* | 12/2011 | Boldyrev et al. | 715/863 |
| 2012/0110052 A1* | 5/2012 | Smarr | G06Q 10/10 709/201 |
| 2012/0146923 A1* | 6/2012 | Basir | 345/173 |
| 2014/0032635 A1* | 1/2014 | Pimmel et al. | 709/203 |
| 2014/0297876 A1* | 10/2014 | Aquilina et al. | 709/227 |

OTHER PUBLICATIONS

U.S. Appl. No. 13/042,446, filed Mar. 7, 2011, Ricci.

Bump Technologies, "Bump (Application)", http://en.wikipedia.org/wiki/Bump_(application), Feb. 18, 2011.

"Remote Desktop Protocol" http://en.wikipedia.org/wiki/Remote_Desktop_Protocol, printed Apr. 26, 2011.

"Welcome to the Synergy Project" http://synergy-foss.org., printed Apr. 26, 2011.

* cited by examiner

METHOD AND APPARATUS FOR ALLOWING DRAG-AND-DROP OPERATIONS ACROSS THE SHARED BORDERS OF ADJACENT TOUCH SCREEN-EQUIPPED DEVICES

FIELD

An exemplary aspect is directed toward enhanced communications. More specifically, an exemplary aspect is directed toward allowing drag-and-drop operations across the shared borders of adjacent devices, such as touch-screen equipped devices.

RELATED ART

The "bump" application for the iPhone® and Android® operating systems allow data to be moved from one device to another. Quoting from Wikipedia® "Bump allows users to send contact information, photos and other objects between phones. Before bumping phones, each user confirms what he or she wants to send to the other user. To use the application, two people bump their phones together and within about 5 to 10 seconds, a screen appears on both users' screens allowing them to confirm what they want to send to each other. When two users bump their phones, the data is automatically sent through a separate internet server to the other user, which is able to detect when any two phones using the application bump each other."

BACKGROUND

People who have high-end desktop telecommunications devices, such as enterprise level phone systems, are also likely to have a high-end mobile device, such as an often seen touch screen-type mobile device that allows web surfing, e-mail management, social networking and telecommunications functionality. It is reasonable to expect the users may wish to transfer information or an ongoing operation that was initiated on one of those devices to the other device. For example, a user who has initiated a telephone conversation on the desktop communication device may wish to move the conversation from the desktop communication device to the mobile communication device in order to continue the conversation outside of the office. Another likely scenario is that a user who is engaged in a desktop communication device-based telephone conference may wish to add a party, presently connected only via a mobile communication device, to the conference. Or the user may simply want to use the mobile communication device to call a party that is on the desktop communication device directory but not on the mobile communication device directory.

SUMMARY

One exemplary problem addressed by an aspect disclosed herein is that there is no user-friendly way to perform operations such as these. An exemplary aspect solves this problem in a way that it is consistent with the overall look and feel that many users are accustomed to using when it comes to touch screen-type devices, with the technology being usable with devices that are stationary or portable.

With regard to the types of observations described above in which an in-progress call is moved from one end-point to another end-point, one approach with a commercially available enterprise-level communications system requires users to make a series of button presses. Illustratively, if a user receives a call on an Avaya® Model 9630 IP telephone, with the extension 1234, and wants to move that call to another phone with the extension of 5678, the user must (1) press "transfer" on the 9630 phone, (2) dial 5678 on the 9630 phone, (3) press "transfer" again on the 9630 phone, and then (4) answer the call on the phone with the 5678 extension. This process is cumbersome, not intuitive, does not conform to the standard touch screen-style user interface, and has a gap of several seconds during which the user is not able to communicate with the other party(s).

In the following example, two communications devices will be conveniently referred to as "first phone" and "second phone" simply for illustrative purposes. As will be appreciated from the following description, the techniques disclosed here and can be implemented on a wide variety of products, platforms, devices, communications devices, enterprise communications devices, desktop communications devices, and the like, running various operating systems. The first phone and second phone were illustratively selected based on the assumption that they are produced by different manufacturers, use different operating systems and typically connect through different networks. However, as will be appreciated from the following description, the first phone and the second phone could be the same or similar products that share any one or more similar features.

A common feature of moderate graphical user interfaces that adds to their ease of use, to include the touch screen-based interfaces of many types of communications devices, is that many operations can be performed via a drag-and-drop procedure. For example, a first device may add a party to a teleconference by finding a representation of the party to be added on the first device's screen, e.g., a picture or directory entry, touching the on-screen representation of that first party, sliding that representation over to a spotlight or "hot spot," and then lifting the finger from the screen. This procedure then adds the party to the call. One problem is that this simple procedure is not available if the telephone conference exists on a first device and the representation of the desired party exists only on a second device.

One exemplary concept underlining the present disclosure is a user interface in which the displays of different devices become "synchronized" when the devices are brought into close proximity with one another. Specifically, an exemplary embodiment permits drag-and-drop procedures that originate on one device to be terminated on the other. Illustratively, the problem identified above could be handled in the following manner:

The user would place the second device alongside or in close proximity to the first device,
The two devices would detect each other,
The user would touch the representation (such as an icon) of the party on the second device's display that they wish to add to the call,
The user would slide the representation across the first device/second device border onto the first device's screen,
The user would slide the representation to a spotlight or hot spot and then lift the finger from the screen,
The party would be connected to the call.

Further to the examples discussed above, a user can move an in-progress telephone call from one device to the other by dragging a representation of the call across the borders of the two devices, or could initiate a call on one device to someone listed on the other device's directory by dragging the directory information across the border. Note in this regard that the described operations can be performed across those platforms if one knows the rather cumbersome keystroke commands that are required to execute the operations. For example, an in-progress call on the first device can be moved to the second device by executing a call transfer operation on the first device. For operations such as those described above, the chief benefit of an exemplary aspect described herein is not only that it allows new operations to be performed, but instead allows cross-platform operations to be performed in a user-friendly manner that is consistent with the touch screen look-and-feel interfaces of the devices being used.

An exemplary aspect also facilitates the types of operations that may be expected to become more common in the future. For example, users may expect to receive phone calls on audio-only mobile devices that originate from video-enabled end points. An exemplary aspect allows the called party to move the received call easily from the audio-only device to a device that supports the necessary media types and codecs.

The required synchronization of the user interfaces of the two devices could be achieved by communication pathways that are known in the art, such as Bluetooth®, wireless, IR, wired, or the like.

In a simple implementation, a specific location alongside a first device could be identified as the spot where the second device would need to be placed. A more sophisticated implementation would allow the first device to provide appropriate display synchronization for a second device that is placed anywhere alongside the first device. An even more sophisticated implementation would allow the first device to synchronize with a plurality of second devices, serially or simultaneously. Note, that in this later configuration, the first device could serve as an intermediary device, allowing the convenient transfer of operations or data from one device to the other, or vice versa.

In another exemplary embodiment, that would not necessarily involve cross-border drag-and-drop synchronizing of the second device with the first device, could cause the second device's display to be duplicated on the first device's display such that control of the second device and/or the cross-platform operations, could be performed entirely on the first device.

In addition to the communication management embodiments discussed above, the exemplary techniques disclosed herein can be extended to data, such as call records, images, documents, media, multimedia, information, or in general any data, application or information, or communication management could be exchanged between the devices as discussed herein, as can in-progress operations that are supported on both devices, e.g., telephone calls, IM conversations, browser-based sessions, running applications, and the like. In an illustrative scenario, a movie that a user started to watch on a laptop computer could be dragged off the computer onto a television, or from the television on to a mobile device using the exemplary techniques disclosed herein.

In accordance with another exemplary embodiment, one or more of data, applications, licenses, calls, call control, and in-progress operations can be moved from one device to another device, via a user interface that has a similar drag-and-drop look-and-feel that is presented by the devices when they are used individually.

In accordance with another exemplary embodiment, when a first device is brought into a sensible area of a second device, an icon could appear as a drop location on one, the other, or both devices. This would allow drag-and-drop functionality between the devices such that a user on the first device could drag an icon representing, for example, a call to the icon representing the second device, with the icon representing the second device being a drop target such that the call is transferred to the second device upon completion of the drag-and-drop operation.

In accordance with yet another exemplary embodiment, a license such as a user license for an application, movie, song or the like, could be transferred between devices. In conjunction with this, could be the appropriate registration, de-registration and re-registration of the license, as well as the option of a time-out or expiration of the license on the second device, with the license optionally reverting to the primary device after a predetermined period of time.

In accordance with another exemplary embodiment, a portion of a particular application, media presentation, data, or the like, is transferred between devices. In accordance with a first example, call control signaling could be maintained on a first device, while the audio transferred to another. For example, during a web conference, a user drags the icon representing the conference from the first device to the second device which effects transfer of the media channels; however call signaling could be kept on the first device. This could be particularly useful in situations where call signaling should advantageously be maintained on the more powerful device or a device that has a land-line connection to, for example, the media server. This could also be useful where call control desires to be maintained on the first device, with the audio, media and other channels on the second device. An even more specific example of where this ability would be helpful is if the user of an Avaya Model 9630 telephone receives a TTY call. Because the 9630 has no inherent TTY functionality, the user will want to transfer the media stream to a TTY device, while retaining access to the 9630's signaling and call-control functions.

In accordance with another exemplary embodiment, briefly mentioned above, license transfer can be effected between the two devices using similar drag-and-drop functionality. In accordance with one exemplary embodiment, the license is transferred optionally without the underlying executable, data, or in general the information to which the license is associated. For example, and for a license governing the use of an executable (e.g., an application), the desired transfer of the "executable" to the second device can be detected as discussed above based on the drag-and-drop of the icon representing the executable to the other device. Then, instead of transferring the executable, appreciating that the devices may be running different operating systems and have different versions of the same program that would be used on the two separate and the distinct devices, the license for the executable is transferred from the first device to the second device. The second device, if it already has the executable installed, activates the executable in accordance with the license.

In accordance with another exemplary embodiment, upon detection of the transfer of the license, the second device obtains the executable associated with the license, installs the executable on the second device, and then runs the executable in accordance with the license. This can eliminate any compatibility problems that may arise in trying to transfer an application to a different platform.

In accordance with yet another exemplary embodiment, the license is transferred while the executable, or in general any underlying information, resides on a remotely located cloud or server(s), the license governing use as is normally done. Associated with the license transfer could also be any necessary information to allow the second device to access the remotely-located executable, optionally including any user or preference information that may have been present while running the executable on the first device.

In accordance with yet another exemplary embodiment, a user desires to transfer a movie from the first device to the second device. Upon the second device being brought into proximity of the first device, or the user otherwise associating the two (or more) devices, one or more of the devices activate a portal or border that is a detectable area that allows the drag-and-drop of information between the two devices as discussed herein.

For this particular exemplary embodiment, an icon representing the movie, or the window in which the movie is being displayed, is dragged towards the portal or border (which is a sensible area that can detect the presence of an object) with the effect being the transfer of the movie to the second device. The transfer can be effected in accordance with a number of exemplary ways based on the use of session information.

More specifically, and in accordance with an exemplary embodiment, this session information is used to track the state of use of information, such as a movie, executable, or the like, on the first device when it is transferred to the second or more devices. This session information can include information such as where the resource is stored, duration of the resource, e.g., movie, current playback position of the movie, window size, quality information, e.g., bitrate, and in general any information relating to the playback of the movie on the first device. Then, for example, if the movie being viewed on the first device is resident locally, the drag-and-drop operation could transfer the movie from the first device to the second device in any of the following ways. First and the most simplistic is a file transfer of the movie from the first device to the second device. In accordance with another example, an ad-hoc network could be established between the first and second devices, with the first device acting as the "host" and streaming the movie to the second device either between the connection between the first and second devices or using, for example, another network such as the internet, intranet, LAN, WAN, or in general via any distributed network. A third exemplary scenario is where the movie resides in either a remote server and/or the cloud. In this situation the session information can include the source of the movie, such as IP address, as well as all other pertinent information including, but not limited to, for example, user information, purchase information, current playback position, licensing information, account information, codec information and the like. Therefore, upon transfer of the session information from the first to the second device, the second device can commence playback where playback ceased on the first device.

In accordance with another exemplary embodiment, only a portion of a selected file is transferred from the first device to the second device. For example, in the case of multimedia content, a portion of the media could be transferred to the second device, while some portions remain on the first device. For example, a portion of multimedia content could be broken out such that, for example, audio is sent to a second device while video content is maintained on the first device. For example, upon detecting the request to transfer content from the first device to the second device, a user could be queried as to whether they want to transfer the entirety or a portion of the content. For example, a pop-up could be displayed that allows a user to select which portions of the content they would like transferred, and which portions should remain on the device from which the transfer was initiated.

In accordance with another exemplary embodiment, in addition to the underlying application, data, media content, or the like that is transferred from a first device to a second device, additional information can also be associated with and carried with the transfer. For example, in the transferring of a call-type scenario, when the user drags an icon representing a call from the first device to the second device, not only can the icon representing the call be bridged or transferred to the second device, but also call information, such as the number or numbers involved in the call, the duration of the call, any emoticons or images associated with the call, or in general any information associated with the call, application, data, media content, or the like.

As will be appreciated, the portal, border, or hotspot or landing zone can be located in any one or more portions of a device, and need not be limited to a periphery or perimeter thereof. For example, and in accordance with one exemplary embodiment, when two devices are synchronized or otherwise brought into communication with one another, an icon representing the connected device can be displayed on the first device. In a similar manner, an icon representing the first device can be displayed on the second connected or associated device. These icons can be the location to which an application, media, call, information, or the like is dragged on to effect the transfer between the devices. In addition to the icon being the location to which the information is drag-and-dropped to effect the transfer, this location can be customized, placed in any portion of the display, configured to any size, and can be, for example, editable by a user.

Even further, velocity information can be used with the drag-and-drop operation. For example, if the drag-and-drop originates in the center of the screen and is directed toward the right of the screen with the drag-and-drop operation "extending past the border of the screen" (based on the detected velocity of the "drag" operation), such as when a user traverses from the center of a screen device "right off" the right hand side of the screen, (e.g., when the finger moves from the center of the screen and off of the right hand side of the device) this could trigger the detection of a drag-and-drop operation to an adjacent device(s).

This action can also be indicative of a desire to transfer an underlying object and can trigger the transfer request in conjunction with the detection of direction information. For example, there is a plurality of devices associated with or otherwise connected to a first device. For example, if a second device is located at the 12 o'clock position relative to the first device, and a third device is located at the 3 o'clock position relative to the first device, a drag-and-drop operation towards the top of the screen on the first device can affect the transfer to the second device, and similarly a drag-and-drop operation off the first device to the right-hand side can affect the transfer to the third device. For example, a device can be equipped with global positioning service capabilities and/or triangulation capabilities and/or optical capabilities to allow a first device to recognize, monitor and record the position of the one or more adjacent devices. This position information can then be coordinated with the transfer direction information to assist with movement/transfer of the underlying object to the other device(s).

For example, a triangulation calculation can be based on a ping (or the like) to the adjacent device(s) and/or triangulation of the device(s) to one or more towers or cells or access points. Additional technology that could be used to detect position(s) of adjacent devices could be optical, inductive, capacitive, and in general any technology that allows the detection of one device relative to another. Position information associated with each device can then be used by the device(s) to determine the relative position of one or more other devices. This information can optionally be reflected in the display of the device such that when the adjacent device(s) is detected the hot spot that allows the transfer of information to that other device located on the screen closest to that device. Therefore, expanding on the example above, the icon representing the second device would be at the top of the screen and the icon representing the third device would be on the right hand of the right device's screen.

In accordance with yet another exemplary embodiment, and to facilitate feedback to the user to allow them to determine when a transfer is successful, one or more of a visual and audible queue can be provided to the user upon the detection of a transfer request. For example, if the user slides an icon representing a phone call from a first device towards the second device, the icon can blink before leaving the first device and before "landing" on the second device. In a similar manner one or more of beeping or vibration can be used to allow a user to determine when the transfer request has been successful, with the option of querying the user before completion of the transfer request to insure the transfer was desired.

In accordance with yet another exemplary embodiment, where the touch screen also includes the ability to sense pressure-sensitive information, when an icon representing information is dragged to a location to effect a transfer request, when the user "pushes" on the screen with the icon overlaying a portion of the hot spot, this "pushing" motion can be indicative of a users desire to "push" that information represented by the icon to the other device. As discussed above, this is equally applicable for any type of information, including but not limited to, executables, multimedia, communications such as calls, and in general any information associated with the device.

In accordance with yet another exemplary embodiment, a plurality of icons can be drag-and-dropped to an associated device in a similar manner. For example, a user could start a conference call in a first device by dragging and dropping three icons representing three different parties together. The first device would then initiate the conference call between the parties with this conference call being transferable to a second device by dragging the icon representing the conference call to the second device.

The association of two or more devices can also be used to enlarge screen real estate, such that the two or more devices' screens can be combined for a larger working area for the user. Similar to a dual monitor configuration, the screen of the first device could be extended to allow a window to be extended over both devices.

In accordance with another exemplary embodiment, the disclosed technology allows dragging and dropping of, for example, a document to a touch screen compatible printer to print the document.

In accordance with another exemplary embodiment, the disclosed technology allows dragging and dropping a conversation onto a 'speech-to-text' device for transcripts to, for example, assist people with a hearing disability.

In accordance with another exemplary embodiment, the disclosed technology includes an ability to check/scan for a 'virus' or Trojan before accepting anything on the second device.

In accordance with yet another exemplary embodiment, movement of a single-platform license from Device A to Device B via the drag-and-drop mechanism is disclosed, an optional enhancement to this mechanism is the ability for the license to revert automatically or semi-automatically back to Device A in response to a specific event or trigger (e.g., expiration of a time-out period that had been specified by the owner of Device A). Note in this regard that the devices do not need to be near each other, or even on-line, for the license reversion to take place; the expiration of B's license, and reactivation of A's license, could be achieved with a simple timing mechanism.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any non-transitory, tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, DVD, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, this disclosure is considered to include a tangible storage medium or distribution medium and prior art-recognized equivalents and successor media, in which the software implementations of the present embodiments are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the embodiments are described in terms of exemplary embodiments, it should be appreciated that individual aspects of the embodiments can be separately claimed.

The preceding is a simplified summary of the embodiments to provide an understanding of some aspects of thereof. This summary is neither an extensive nor exhaustive overview of the various embodiments. It is intended neither to identify key or critical elements of the embodiments nor to delineate the scope of the embodiments but to present selected concepts of the embodiments in a simplified form as an introduction to the more detailed description presented below. As will be appreciated, other embodiments are possible utilizing, alone or in combination, one or more of the features set forth above or described in detail below.

BRIEF DESCRIPTION OF THE DRAWINGS

The exemplary embodiments disclosed herein will be discussed with relation to the figures wherein.

DETAILED DESCRIPTION

The techniques will be illustrated below in conjunction with an exemplary electronic system. Although well suited for use with, e.g., a system using a computer/electronic device, server(s), communications devices, touch-screen mobile devices, and/or database(s), the embodiments are not limited to use with any particular type of electronic device(s) or system or configuration of system elements. Those skilled in the art will recognize that the disclosed techniques may be used in any application in which it is desirable to provide enhanced file transfer, collaboration and communication capabilities.

The exemplary systems and methods will also be described in relation to software (such as drivers), modules, and associated hardware. However, to avoid unnecessarily obscuring the present disclosure, the following description omits well-known structures, components and devices that may be shown in block diagram form, are well known, or are otherwise summarized.

For purposes of explanation, numerous details are set forth in order to provide a thorough understanding of the embodiments. It should be appreciated, however, that the techniques disclosed herein may be practiced in a variety of ways beyond the specific details set forth herein.

As can be appreciated by one skilled in the art, although specific methods and techniques have been described for using detecting drag-and-drop operations to another device, the disclosure is not limited to the disclosed techniques.

Figure 1:
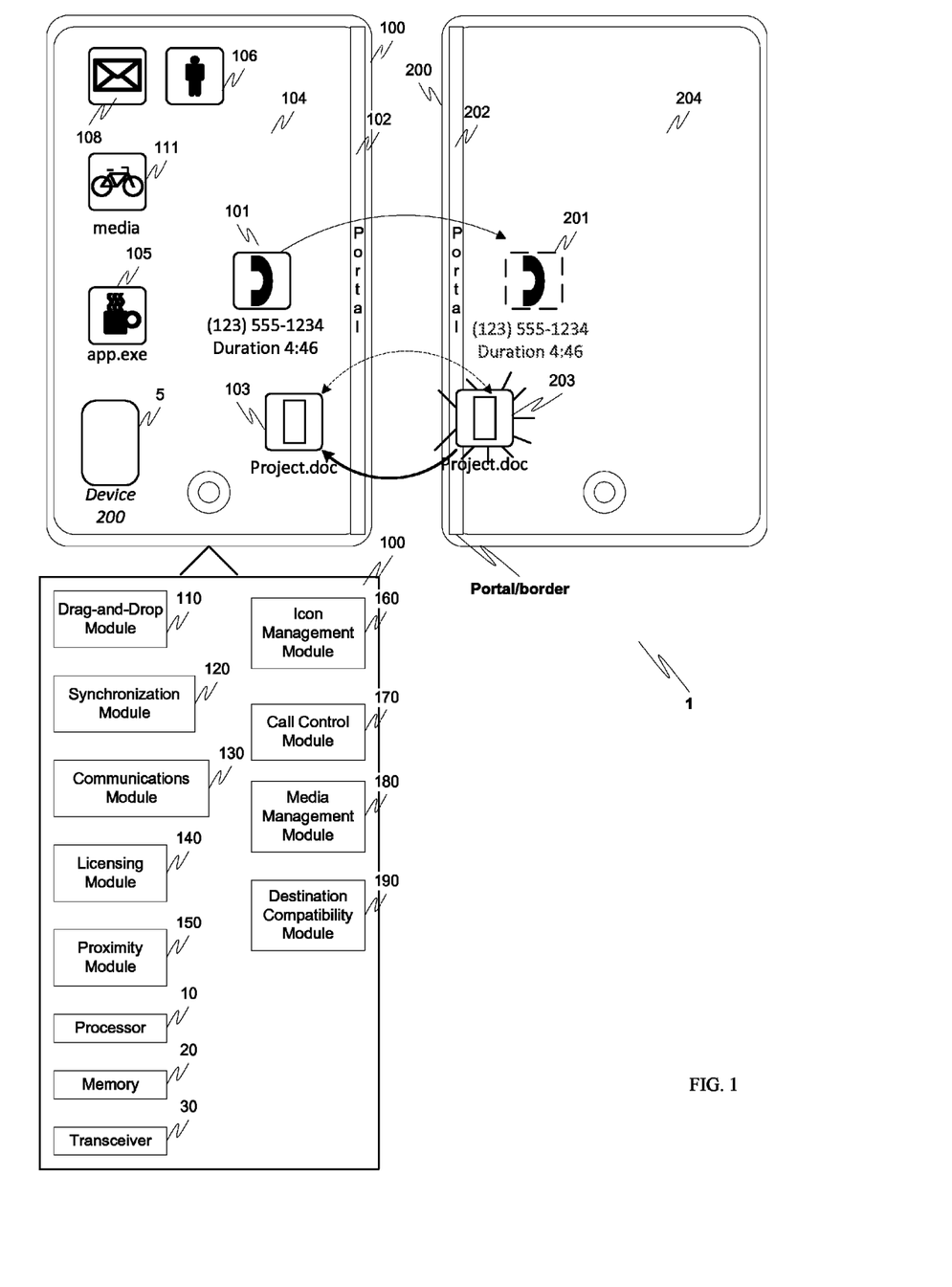
FIG. 1 illustrates an exemplary communications environment.

FIG. 1 illustrates an exemplary communications environment 1. Within this exemplary communications environment 1 are two or more communications devices, such as communications devices 100 and 200. The communications devices 100, 200 can be any type of communication device including, but not limited to, a cell phone, mobile phone, smart phone, enterprise phone, cordless phone, desktop phone, soft phone, computer, personal computer, tablet pc, netbook, touch-screen equipped device, or the like. It should also be appreciated that the communications devices 100, 200 need not be limited to communications devices, but in general can be any type of electronic device having a touch-screen or capabilities for drag-and-drop operations.

In general, each communication device 100 and 200, in addition to well known componentry, includes a touch-screen 104, 204, respectively, and one or more icons that represent, for example, applications, calls in progress, and the like.

Each communication device can include comparable elements such as a drag-and-drop module 110, synchronization module 120, communications module 130, licensing module 140, proximity module 150, processor 10, memory 20, transceiver 30, icon management module 160, call control module 170, media management module 180 and destination compatibility module 190.

For ease of convenience, the following description will be directed toward two communications devices 100, 200, both equipped with touch screens 104, 204 respectively, and each including a portal or border 102/202 respectively that assist with the transfer of information between devices. As discussed, this information can include any type of information including one or more of an application, license, communication session, multimedia session, document, contact, music, picture, chat session, browsing session, video, or some portion thereof, from one device to the other. Moreover, for ease of illustration, the underlying network(s) and communications channels that can be used to assist with the exchange of information between the devices has been omitted for clarity, but it should be appreciated that any type of wired or wireless network, or communication protocol(s) can be used to exchange information between the devices. As discussed, this can include one or more of WiFi, Bluetooth®, IR, the internet, a wide-area network, a local area network, or any combination thereof.

Furthermore, and for ease of illustration, such devices as communications switches, media servers, streaming servers, gateways and other types of network devices have also been omitted for clarity.

Additionally, it should be appreciated that the communications devices may include other elements such as a speaker phone, handset, dedicated telephone-like display, a soft or hard keypad, as well as various hard or soft buttons that enable, for example, conference calling, placing a party on hold, muting and the like.

In operation, the sharing information process begins by communication device 100 detecting the presence of communication device 200 in cooperation with the proximity module 150, processor 10 and memory 20. More specifically, the proximity module 150 detects the presence of communication device 200 via one or more of a user request, a proximity sensor that can be based on one or more of inductive, capacitive or other detection technology, via Bluetooth® detection, via wireless, such as WiFi network/hotspot detection, or the like. In general any methodology that allows for the communications device 100 to automatically, semi-automatically or manually detect the presence of communications device 200 can be used with equal success.

In addition, and in conjunction with detecting the presence of the communications device 200 by the proximity module 150, the synchronization module(s) 120 gathers sufficient information for either one or two-way information exchanges such as the Bluetooth® address, IP address, IR address, phone number, or in general any identifier that allows the identification of communications device 200, such that information can be exchanged with communications device 200. This information can serve as the basis that allows for the routing of the exchange of information as well as can be used as the basis for populating an icon on communications device 100, representing communications device 200, or vice versa. As discussed, this icon can be used as the "hot spot" to which other icons are dragged, the action being indicative of a user's desire to transfer the underlying information associated with that icon to the other device.

Once communication device 100 and communication device 200 have established their relative proximity and further established means (protocols, communications channel(s), WiFi links, Bluetooth®, personal area network(s), piconet(s), and/or over a distributed network, or the like) for communicating between the two devices, there are a number of different methods of operation in which the two devices can operate.

In a first mode of operation, the screen of communication device 100 is synchronized with the screen of communication device 200. More specifically, in the synchronization of screens embodiment, an icon representing the second device is displayed on the first device, and optionally an icon representing the first device displayed on the second device. Associated with this icon can be identifying information such as the name of the discovered nearby device that can, for example, be automatically determined based on, for example, one or more of phone number associated with the device, a picture of the device (from for example a device library) a name assigned to the device by a user, or in general can be any identifier associated with the device such as the manufacturer and model number.

As previously discussed, the icon representing the second device being displayed on the first device facilitates drag-and-drop operations which can be executed by the user drag-and-dropping an icon on the communication device 100 to the icon 5 representing the second device that is displayed on the touch-screen 104 of communications device 100. Upon detection of this drag-and-drop operation, one or more of the underlying information or objects, session information, communication information, call information, SIP information, or in general any information, can be transferred to the communications device 200. Upon completion of the transfer, the icon that was drag-and-dropped from communications device 100 to communications device 200 can be shown on the touch-screen 204 of communications device 200 with the user then optionally able to manipulate the underlying information represented by the icon. This drag-and-drop monitoring can continue until the devices are separated or otherwise disconnected from one another with the prior made association between the devices being terminated.

In a second exemplary embodiment, the screen, or a portion thereof, of one device is embedded on the other. Even more specifically, an exemplary embodiment replicates the screen (and all or portion of the icons displayed thereon) of the second device on the screen 104 of the first device. For example, the screen of the second device can be shown in a window on the screen 104 of the first device such that icons within the embedded screen can be drag-and-dropped on to screen 104, and similarly, icons on screen 104 drag-and-dropped into the embedded screen windowed on 104.

In accordance with another exemplary embodiment the screen of the first device is extended to the screen of the second device, thus providing a single user interface comprised of the two touch-screens 104 and 204. In this exemplary embodiment, the screens 104 and 204 are merged such that a sliding action of an icon on screen 104 over to screen 204 will translate into the transfer of the information represented by the icon from device 100 to device 200. One difference between this embodiment and the above embodiments is that each screen maintains its respective look-and-feel with the same icons that are present on it, and there does not need to be duplication of icons from one device to the other. The drag-and-drop operations of this embodiment work in a similar manner to that as already described above.

In accordance with another exemplary embodiment, the first device is a touch-screen mobile communications device, and the second device is a point-of-sale machine, such as a gas pump, grocery store checkout, or the like. The drag and drop functionality described herein can be used to transfer, for example, a coupon, payment information, or in general any information, from the communications device to the point-of-sale device in a similar manner, with the communications device detecting the point-of-sale device, or vice versa, the point-of-sale device being represented by an icon on the communications device. Then, an icon representing for example, the coupon, could be dragged from the screen on the first communications device on to the icon representing the point-of-sale device, with the action resulting in application of the coupon by the point-of-sale device to the current transaction.

In accordance with another exemplary embodiment, one or more of the communications devices are equipped with a portal, border, hot spot, or the like, (102, 202) that facilitates the detection of a desire to transfer from a first device to a second device. In accordance with one exemplary embodiment, and in cooperation with the synchronization module 120, proximity module 150, and processor 10, an area of a device is enabled to detect the transition of an icon thereto. Further in cooperation with the drag-and-drop module 110, the movement of an icon into this area is detected, and it is determined what type of transfer request is being requested to the other device(s). For example, a first type of transfer request can be the transfer of an icon and underlying session information. Another type of transfer request could be to transfer one or more of a file, data, media, contact, audio file, multimedia file, document, calendar information, or in general any information from a first device to another device. Another exemplary embodiment allows the transfer of a call or a communications session or a portion thereof to one or more additional devices. Yet another exemplary embodiment allows the transfer of a license as discussed hereinafter. For each of these types of transfers, an underlying associated module assists with the transfer as discussed hereinafter, with the transfer allowing management of the underlying transferred information upon the icon "landing" on the second or more devices.

For example, with the transfer of a communication, and in cooperation with the call control module 170, processor 10, memory 20 and transceiver 30, a request to transfer a communication is detected. As discussed, this can be, for example, the dragging-and-dropping of icon 101, representing an in-progress call, to a specific destination, to touch screen 204, where the same call is represented by icon 201. In accordance with an optional exemplary embodiment, the capabilities of the destination endpoint are detected in cooperation with the destination compatibility module 190. For example, if the destination endpoint has comparable capabilities, i.e., codecs, audio capabilities, multimedia streaming capabilities, conference call capabilities, and the like, all aspects of the communication including the communication itself and call control signaling can be transferred from communication device 100 to communication device 200. As discussed, this transfer can be affected through the use of the transfer of session information that includes all relevant information to allow the transfer of the underlying communication including one or more of SIP routing information, originating endpoint information, destination endpoint information, call control information, parties to the call information, duration information, channel setup information, volume and/or preference information regarding the communication, and in general any information related to one or more of the handling, routing and preferences associated with the communication. As is to be appreciated, the communication can include one or more of a call, video conference, multimedia session, or in general any communication between the first endpoint, such as communication device 100, and one or more other endpoints such as communication device 200.

However, if the destination compatibility module 190 determines that communications device 100 has different capabilities than communications device 200 (the destination endpoint) before effecting the transfer, triggered by the drag-and-drop operation of icon 101 onto communications device 200, the destination compatibility module 190 determines which compatible communications features are present on device 200. Then, upon determining the compatible features, the compatible communications features are transferred with the non-compatible features being re-negotiated as needed, using for example, SIP protocols, and further including the renegotiation of codecs as needed, the adding or subtracting of media paths, and optionally the maintaining of call control information on communications device 100 while transferring the compatible features, such as audio information, to device 200.

As a more detailed example, assume communications device 100 is a multimedia equipped communications device, and communications device 200, the destination endpoint, is only an audio-enabled device. Upon detection of the drag and drop request to transfer a communication, such as a multimedia communication including audio information, video information and white-boarding capabilities, the destination compatibility module 190 determines that the destination endpoint is only capable of reproducing audio information. Therefore, communications device 100, establishes, via SIP (Session Initiation Protocol) call setup procedures for example, that the audio portion of the communication should be forwarded to the destination endpoint, with all call control information, video information, and white-boarding functionality remaining on communications device 100. This could be accomplished via a SIP protocol, with communications device 100 maintaining call control functionality with the other endpoint(s) involved in the communication.

In accordance with another exemplary embodiment, and in cooperation with the media management module 180, drag-and-drop module 110, processor 10, memory 20 and transceiver 30, a media transfer request is detected that resulted from the user dragging-and-dropping an icon, such as media icon 111 to a destination endpoint, when that destination endpoint has been detected by the proximity module 150. As discussed, the detection of this drag-and-drop operation can be based on a number of different technologies including when the screens of the devices are synchronized, when the screen of another device is embedded on a first device, and/or when the screen of a first device is extended to a second device, and a drag-and-drop operation from the first device to the second device, or vice versa, is detected. As with the prior embodiment, and in cooperation with the destination compatibility module 190, the endpoint capabilities can be determined prior to transfer of the media content with the endpoint's capabilities having an effect on how the media file is transferred. For example, the media management module 190 can determine whether the file itself should be transferred, or whether the file should be resident on the first device with remote file information transferred to the second device, e.g., communications device 200.

If the entirety of the file is to be transferred, the file can be transferred from the first device to the second device, with the file capable of being managed on the second device upon transfer completion. This transfer can be effected via any one or more of known file transfer protocols as are well known.

However, if the underlying file is not to be transferred, yet the user desires to use/view the media on the second device, the media management module 180, cooperating with the synchronization module 120, processor 10, memory 20, and transceiver 30, can assemble session information that is transferred to the second device instead of the underlying media file itself. This session information can include file location, current playback position, license information, and any other necessary information that allows the media to be played on the second device, while residing on the first device. As discussed, the two devices can establish and ad-hoc network that allows, for example, certain features of the media such as audio-and-video to be streamed to the second device, while the actual media resides on the first device, with the first device acting as a "server" of the media to the second device. In addition, and in cooperation with the destination compatibility module 190, the compatible media features of the destination device can be determined with the renegotiation of codecs being accomplished as needed. The adding or subtracting of media paths and the like, such that the media can be consumed on the destination device after detection of the drag-and-drop operation, are also dynamically updateable to assist with the transfer request.

In accordance with another exemplary embodiment, and in cooperation with the licensing module 140, processor 10, and memory 20, detection of a license transfer request from a first device, such as communications device 100, to a second device such as communications device 200, is detected. This embodiment could be used for example when a user has a license for a particular software application, but does not want to purchase two separate licenses for two separate devices. Thus, the transfer of the license request from a first device to a second device can allow the transfer and legal operation of the underlying application/media content, etc, based on the license, thereby allowing the user to utilize the underlying application/media content, etc., by only possessing one license.

In accordance with this exemplary embodiment, and again in cooperation with the licensing module 140, processor 10 and memory 20, a drag-and-drop operation is detected for "project.doc." A user, having project.doc resident on the communications device 200 as represented by icon 203 desires to further work on the project.doc on communications device 100. Project.doc requires an underlying software application to be run on the drag-and-dropped device in order to edit the project. Therefore, when project.doc is transferred via a drag-and-drop operation into portal 202, the underlying information associated with the project is transferred to device 100, and more specifically on to display 104.

In conjunction with the transfer, a licensing module associated with device 200 determines whether the destination endpoint, e.g., communications device 100, has the necessary underlying object that will use the license, in this case a software editing application for documents with the ".doc" extension. If the object/application is present, and in conjunction with the transfer of project.doc, a license is transferred that allows the underlying editing application to be utilized and activated on communications device 100, just as if the application were running on communications device 200. To insure compliance with all necessary licensing requirements, upon transfer of the license, the license could be automatically de-registered on communications device 200 if and until the license is returned from communication device 100 back to communications device 200. For example, if the user completes editing of project.doc on communications device 100, the license could automatically revert to communications device 200 or the license could remain on communication device 100 until, for example, a user request via a drag-and-drop operation to return the license for the .doc application from the communications device 100 back to communications device 200. The license transfer request could then revert the license back to communications device 200 such that project.doc could further be edited on communications device 200 upon transfer being completed.

However, if transfer of the license from a first device to a second device results in it being determined that the underlying application associated with the license is not present on the other communications device, this could automatically invoke a download request for the underlying software application native to the destination endpoint. For example, the editing software for project.doc could be downloaded by the destination communications device from the software manufacturer with the software manufacturer confident that this is a licensed transaction based on a license transfer request from the communication device 200 to communication device 100. Upon installation of the software application, the license could activate the software with full functionality being provided to edit project.doc, just as previously discussed.

Figure 2:
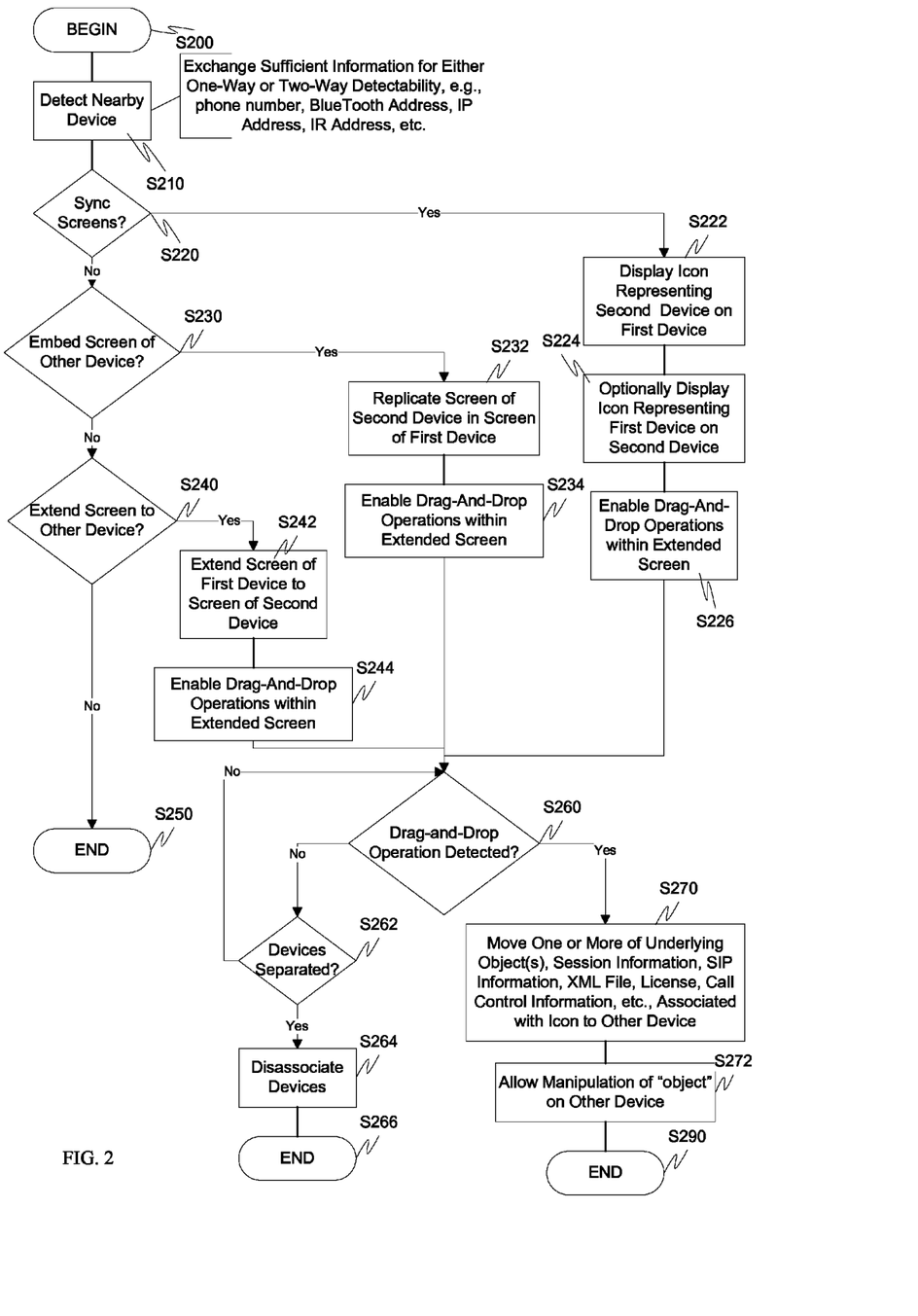
FIG. 2 is a flowchart outlining an exemplary method of drag-and-drop functionality.

FIG. 2 illustrates an exemplary method of associating and sharing touch-screens between two or more devices. In particular, control begins in step S200 and continues to step S210. In step S210, one or more nearby devices are detected, and sufficient information exchanged that allows for either one-way or two-way detectability and transfer of information including one or more of phone numbers, Bluetooth® addresses, IP addresses, IR addresses, and any other information necessary to allow the transfer of information between the two devices. Next, a determination is made in step S220 as to whether the screens should be synchronized between the one or more nearby devices. If the screens are to be synchronized, control continues to step S222 where an icon representing a second device is represented on the first device. Next, in step S224, an icon representing the first device is optionally displaced on the second device. Then, in step S226 drag-and-drop operations are enabled such that when a user drags an icon on the first device's screen to the icon representing the second device on that first device's screen, the underlying information associated with that icon is transferred to the second device. Control then continues to step S260.

If the screens are not to be synchronized, control continues to step S230, where a determination is made whether to embed the screen of the one or more other devices on the first device. If so, control continues to step S232 where the screen of the second device is replicated in the screen of the first device. Then, in step S234, drag-and-drop operations are enabled within the embedded screen with control continuing to step S260.

If the screen of the other device(s) are not to be embedded, control continues to step S240 where a determination is made whether to extend the screen of one device to another device(s). If the screen is to be extended, control continues to step S242 with control otherwise jumping to step S250 where the control sequence ends.

In step S242, the screen of a first device is extended to the screen of the second device, and in step S244 drag-and-drop operations are enabled from the first screen to the extended screen, and vice versa. Control then continues to step S260.

In step S260 a determination is made whether a drag-and-drop operation has been detected. If a drag-and-drop operation has been detected, control continues to step S270 with control otherwise continuing to step S262.

In step S262, a determination is made whether the devices have been separated or there has been a user request to disassociate the one or more nearby devices. If the devices have not been separated or otherwise disassociated, control jumps back to step S260, with control otherwise jumping to step S264. In step S264, the devices are disassociated with control continuing to step S266 where the control sequence ends. As will be appreciated, in the situation where one device is associated with a plurality of other devices, the disassociation can be from one or more of the plurality of the devices and need not necessarily be from all of the plurality of devices at the same time, although this is possible as well.

In step S270, and upon detection of a drag-and-drop operation, the information associated with the icon associated with the drag-and-drop operation is transferred or moved from the first device to the one or more other devices such that the information or underlying object associated with the icon is manageable and manipulatable in step S272 on the transferred-to device. Control then continues to step S290 where the control sequence ends.

Figure 3:
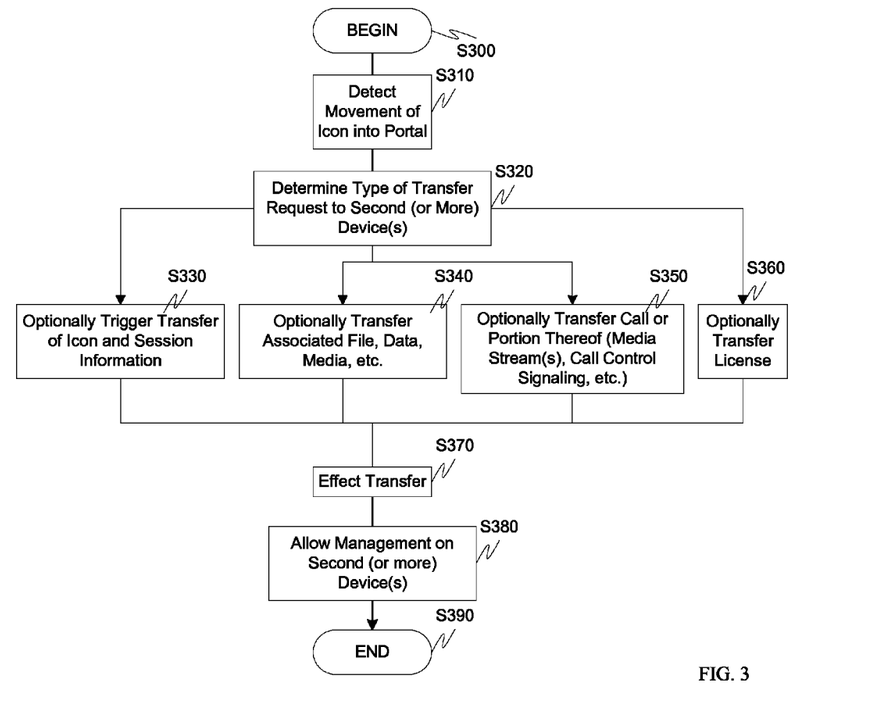
FIG. 3 is an exemplary method outlining in greater detail drag-and-drop functionality.

FIG. 3 outlines an exemplary method of determining a type of transfer request. In particular, control begins in step S300 and continues to step S310. In step S310, a drag-and-drop operation is detected by virtue of detected movement of an icon into one or more of a synchronized screen, embedded screen, extended screen, or portal/border/hot spot. Next, in step S320, determination is made as to what type of transfer request has been detected with control continuing to any one or more of steps S330-S360.

More specifically, in step S330, transfer request is for the transfer of session information such as session information associated with a call, conference, multimedia session, or the like. In step S340, the transfer request is for a file, data, application or the like. In step S350, the transfer request is for a call or a portion thereof with options including transferring of all or a portion of the call with call control signaling, for example, remaining on one device while media streams are transferred to a second device. In step S360, the transfer request is for a license with control continuing for all the above to step S370. Upon detection of the underlying transfer request, in step S370 the transfer is effected with management of the underlying objection, information, or the like, being transferred to the second device in step S380 with control continuing to step S390 where the control sequence ends.

Figure 4:
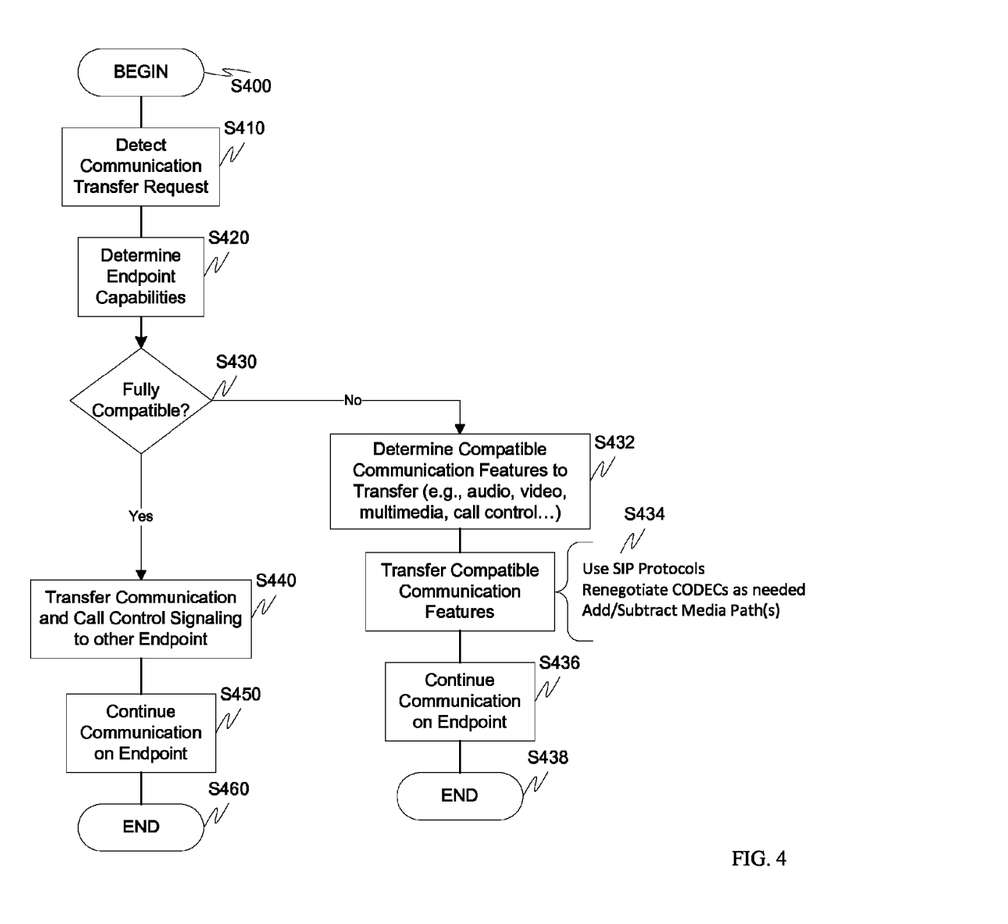
FIG. 4 is an exemplary method for call transfers.

FIG. 4 outlines an exemplary method for a communication transfer. In particular, control begins in step S400 and continues to step S410. In step S410, a communication transfer request is detected. Next, in step S420, the destination endpoint capabilities are optionally determined. Then, in step S430 a determination is made whether the destination endpoint is fully compatible with the detected communication transfer request. If the destination endpoint is fully compatible, control jumps to step S440 with control otherwise continuing to step S432. In step S432, the compatible communications features of the destination endpoint are determined. Next, in step S434, the compatible communications features are transferred, with the renegotiation of codecs and addition or subtraction of media paths managed or dynamically updated as needed. In accordance with a specific exemplary embodiment, this can be easily affected through the use of SIP communications protocols with the addition or subtraction of media paths being easily managed between the two devices. The transferred communication can then continue on the destination endpoint in step S426 with control continuing to step S438 where the control sequence ends.

In step S440, communication and call control signaling can be transferred to the destination endpoint. Next, in step S450, the communication is continued on the destination endpoint where the control sequence ends in step S460.

Figure 5:
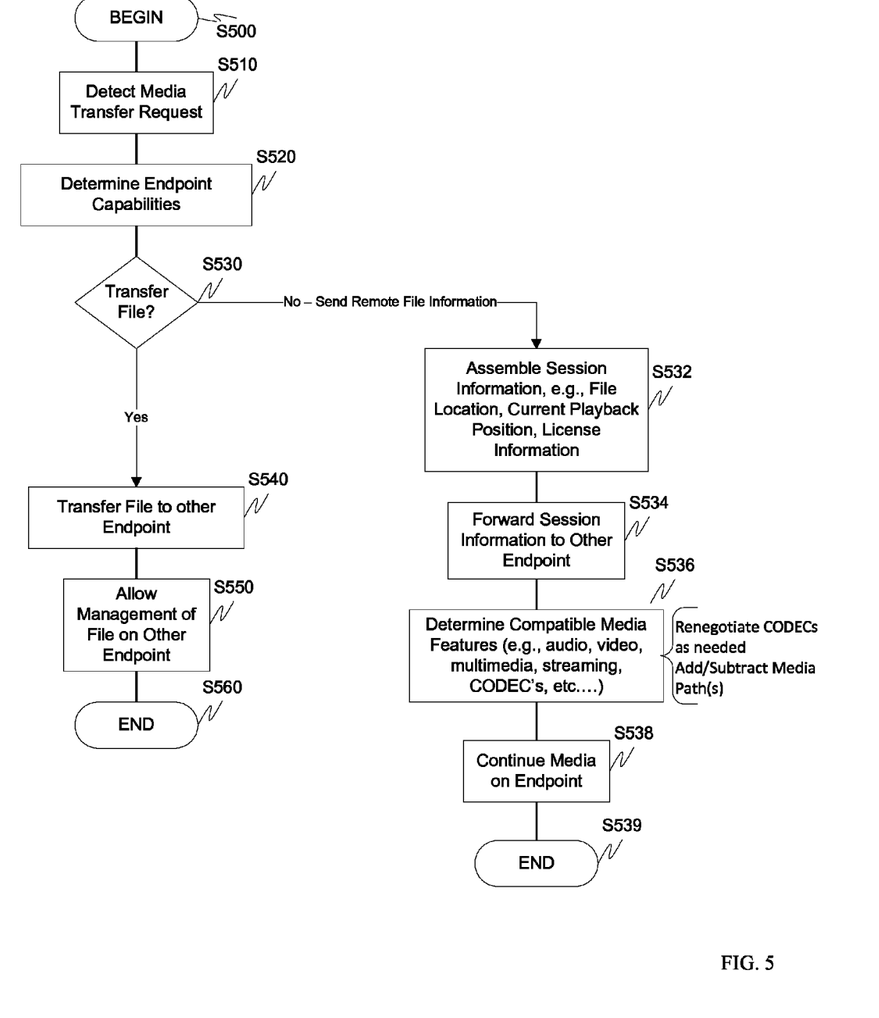
FIG. 5 is an exemplary method for media transfers.

FIG. 5 outlines an exemplary method of media transfer. In particular, control begins in step S500 and continues to step S510. In step S510, a media transfer request is detected, e.g., due to a drag-and-drop operation being detected. Next, in step S520, the destination endpoint capabilities are optionally determined. Then, in step S530, a determination is made whether to transfer the file, such as a movie, song, multimedia presentation, or the like. If the file is to be transferred, control jumps to step S540 with control otherwise continuing to step S532. In step S532 session information is assembled that allows the media to be consumed on the destination endpoint, without transfer of the underlying file. Therefore, for example, the session information can include all information necessary to effect that consumption including one or more of file location information, playback position information, license information, streaming information, and the like. For example, a media player on the destination endpoint can be pointed to the file location of the media on the first device, with the media player playing the media from the first device without transfer of the file to the second device. Next, in step S534, this session information once assembled is transferred to the one or more destination endpoints. Optionally, in step S536, compatible media features can also be determined with the renegotiation of codecs, the adding or subtracting of media paths, and the like, managed and/or dynamically updated as needed. Then, in step S538, the media is consumed on the destination endpoint with control continuing to step S539 where the control sequence ends.

If the file is to be transferred, control continues to step S540 where the file is transferred to the destination endpoint in accordance with known file transfer protocols. Then, in step S550, the file can be one or more of managed, consumed, or otherwise manipulated on the destination endpoint. Control then continues to step S560, where the control sequence ends.

Figure 6:
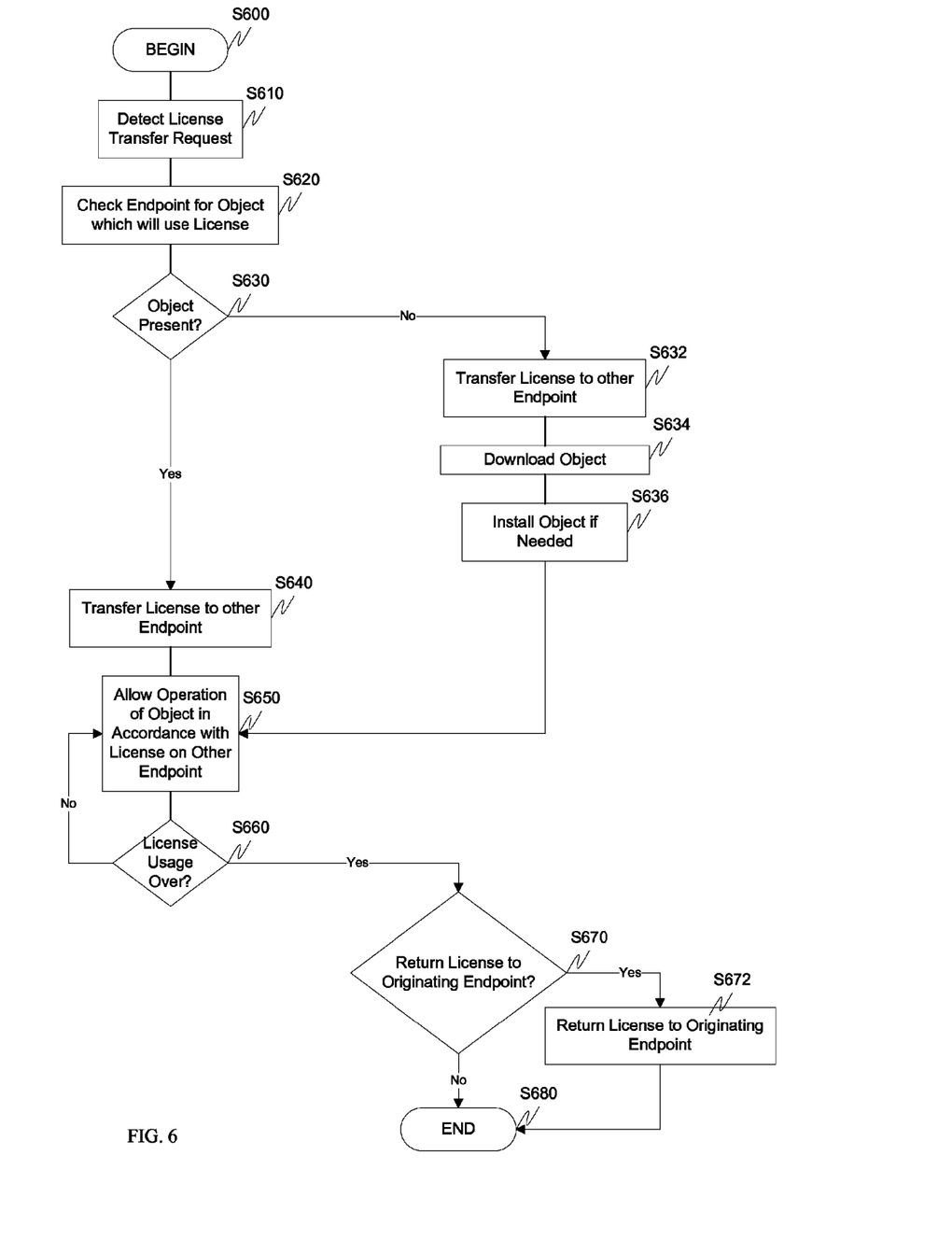
FIG. 6 is an exemplary method for license transfer.

FIG. 6 outlines an exemplary method of license transfer. In particular, control begins in step S600 and continues to step S610. In step S610, a license transfer request is detected. Next, in step S620, a destination endpoint is checked for determination whether the object, e.g., application associated with the license, is present on the device. If the object is present in step S630, control continues to step S640 with control otherwise continuing to step S632. In step S632, the license is transferred to the destination endpoint and the object associated with the license downloaded in step S634. In step S636, the object, such as an application, is installed and associated with the license, and thereby activated. Control then continues to step S650.

If the object is already present on the destination endpoint, in step S640 the license is transferred to the destination endpoint. Next, in step S650, and upon activation of the object by the license, the object can be operated in accordance with the license. Next, in step S660, a determination is made whether the licensed usage is complete. If the licensed usage is complete, control continues to step S670 with control otherwise jumping back to step S650.

In step S670, a determination is made whether the license should be returned to the originated endpoint. If the license is to be returned to the originated end point, control continues to step S672 with control otherwise jumping to step S680 where the control sequence ends.

In step S672, the license can be one or more of automatically returned or user request-based returned to the originating endpoint, with control continuing to step S680 where the control sequence ends.

While the above-described flowcharts have been discussed in relation to a particular sequence of events, it should be appreciated that changes to this sequence can occur without materially effecting the operation of the embodiments. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols herein can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems described herein is dependent on the speed and/or efficiency requirements of the system, the particular function, and the particular software or hardware systems or microprocessor or microcomputer systems being utilized. The security systems, methods and protocols illustrated herein can be readily implemented in hardware and/or software using any known or later developed systems or structures, devices and/or software by those of ordinary skill in the applicable art from the functional description provided herein and with a general basic knowledge of the computer and security arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods described herein can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided systems, apparatuses and methods for facilitating exchange of information. While the embodiments have been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A method for transferring information comprising:
  detecting, by a processor, that a first device is in close proximity to a second device, wherein the second device has an active voice or video call from a first party to a second party;

in response to the detecting that the first device is in close proximity to the second device, associating, by the processor, the first device with the second device;

detecting, by the processor, a drag-and-drop operation from the first device to the second device, the drag-and-drop operation indicative of a desire to transfer information from the first device to the second device; and in response to detecting the drag-and-drop operation from the first device to the second device:
causing, by the processor, synchronization of at least a portion of a display of the second device;
receiving, by the processor, the transferred information from the first device, wherein the transferred information is information about a third party to be added to the active voice or video call on the second device between the first party and the second party, and wherein the information about the third party is not on the second device before the information about the third party is transferred; and
adding, by the processor, the third party to the active voice or video call on the second device.

2. The method of claim 1, wherein the second device comprises a plurality of devices, and further comprising detecting, by the processor, movement of an icon representing the third party in a direction corresponding to one of the plurality of devices, wherein the information is transferred to the one of the plurality of devices based on its position relative to other ones of the plurality of devices.

3. The method of claim 1, further comprising detecting, by the processor, compatibility of the second device.

4. The method of claim 1, wherein the first device is a communications device with a touch screen.

5. The method of claim 1, wherein the third party is represented by an icon.

6. The method of claim 1, wherein the active call is the video call.

7. The method of claim 1, wherein the active call is the voice call.

8. The method of claim 1, wherein the first device and the second device are communication devices and wherein synchronizing at least a portion of a display of the second device to the first device permits the drag-and-drop operation to originate on the first device and permits the drag-and-drop operation to be terminated on the second device, wherein terminating the drag-and-drop operation on the second device comprises continuing a display of the drag-and-drop operation on the second device.

9. A first device to transfer information comprising:
a microprocessor; and
a computer readable medium, coupled with the microprocessor and comprising microprocessor readable and executable instructions that cause the microprocessor to execute:
a proximity module that detects a second device is in proximity to the first device and associates the second device with the first device, wherein the second device has an active voice or video call from a first party to a second party;
a drag-and-drop module that detects a drag-and-drop operation from the first device to the second device, the drag-and-drop operation indicative of a desire to transfer information from the first device to the second device, and transfers information from the first device to the second device in response to detecting the drag-and-drop operation from the first device to the second device, wherein the transferred information is information about a third party to be added to the active voice or video call between the first party and the second party on the second device and wherein the information about the third party is not on the second device before the information about the third party is transferred; and
a synchronization module that causes synchronization of at least a portion of a display of the second device and causes the third party to be added to the voice or video call between the first party and second party in response to detecting the drag-and-drop operation.

10. The first device of claim 9, further comprising a destination compatibility module that detects compatibility of the second device.

11. The first device of claim 9, wherein an icon of the second device is displayed on the first device.

12. The first device of claim 9, wherein the first device is a communications device with a touch screen.

13. The first device of claim 9, wherein the active call is the voice call.

14. The first device of claim 9, wherein the active call is the video call.

15. A first device to receive transferred information comprising:
a microprocessor; and
a computer readable medium, coupled with the microprocessor and comprising microprocessor readable and executable instructions that cause the microprocessor to execute;
a proximity module that detects a second device is in close proximity to the first device and associates the second device with the first device, wherein the first device has an active voice or video call from a first party to a second party;
a drag-and-drop module that detects a drag-and-drop operation to receive transferred information from the second device, wherein the transferred information is information about a third party to be added to the active voice or video call on the first device between the first party and the second party, wherein the information about the third party is not on the first device before the information about the third party is transferred; and
a synchronization module that causes synchronization of at least a portion of a display of the first device in response to detecting the drag-and-drop operation and adds the third party to the voice or video call between the first party and second party.

16. The first device of claim 15, further comprising a destination compatibility module that detects compatibility of the second device.

17. The first device of claim 15, wherein the active call is the voice call.

18. The first device of claim 15, wherein the active call is the video call.

* * * * *